United States Patent
Chen et al.

(10) Patent No.: US 10,817,085 B2
(45) Date of Patent: Oct. 27, 2020

(54) ACTIVE STYLUS PEN GENERATING OSCILLATION FREQUENCY RELATED TO APPLIED PRESSURE

(71) Applicant: SILICON INTEGRATED SYSTEMS CORP., Hsinchu (TW)

(72) Inventors: Keng-Nan Chen, Hsinchu (TW); Chia-Yi Chu, Hsinchu (TW); Han-Ning Chen, Hsinchu (TW); Wen-Chi Lin, Hsinchu (TW); Hui-Chung Chen, Hsinchu (TW)

(73) Assignee: SILICON INTEGRATED SYSTEMS CORP., Hsinchu (TW)

( * ) Notice: Subject to any disclaimer, the term of this patent is extended or adjusted under 35 U.S.C. 154(b) by 0 days.

(21) Appl. No.: 15/840,236

(22) Filed: Dec. 13, 2017

(65) Prior Publication Data
US 2018/0173329 A1    Jun. 21, 2018

(30) Foreign Application Priority Data
Dec. 16, 2016   (TW) .............................. 105141759 A (51) Int. Cl.
*G06F 3/038* (2013.01)
*G06F 3/041* (2006.01)
*G06F 3/0354* (2013.01)

(52) U.S. Cl.
CPC ........ *G06F 3/0383* (2013.01); *G06F 3/03545* (2013.01); *G06F 3/041* (2013.01)

(58) Field of Classification Search
CPC .... G06F 3/03545; G06F 3/041; G06F 3/0412; G06F 3/0414; G06F 3/0416; G06F 3/048; G06F 3/044; G06F 3/03546; G06F 3/0383; G06F 3/045; G06F 3/046; G06F 3/047
USPC .................................................. 345/173–179
See application file for complete search history.

(56) References Cited

U.S. PATENT DOCUMENTS

| | | | | |
|---|---|---|---|---|
| 5,571,997 | A * | 11/1996 | Gray | G06F 3/03545 178/19.04 |
| 2008/0128180 | A1* | 6/2008 | Perski | G06F 3/03545 178/18.03 |
| 2008/0129709 | A1* | 6/2008 | Lin | G06F 3/03545 345/179 |
| 2012/0068975 | A1* | 3/2012 | Wei | G06F 3/03545 345/179 |
| 2012/0154340 | A1* | 6/2012 | Vuppu | G06F 3/03545 345/179 |

(Continued)

*Primary Examiner* — Alexander Eisen
*Assistant Examiner* — Nelson Lam
(74) *Attorney, Agent, or Firm* — Maschoff Brennan (57) ABSTRACT

An active stylus pen comprises a touch component and a pressure sensing module. One end of the touch component is disposed at a nib part of the active stylus pen, wherein the touch component is configured to receive an external pressure. The pressure sensing module is connected to the touch component, wherein the pressure sensing module is configured to generate an oscillation signal, wherein the oscillation signal has a first frequency when the touch component receives the external pressure and the external pressure reaches a first threshold value, and wherein the oscillation signal is adjusted to have a second frequency when the touch component receives the external pressure and the external pressure does not reach the first threshold value; wherein a difference of the first frequency and the second frequency is larger than a second threshold value.

9 Claims, 8 Drawing Sheets

(56) References Cited

U.S. PATENT DOCUMENTS

| | | | |
|---|---|---|---|
| 2014/0240298 A1* | 8/2014 | Stern | G06F 3/0383 |
| | | | 345/179 |
| 2014/0253475 A1* | 9/2014 | Han | G06F 3/03545 |
| | | | 345/173 |
| 2015/0123940 A1* | 5/2015 | Park | G06F 3/0416 |
| | | | 345/174 |
| 2015/0378453 A1* | 12/2015 | Wu | G06F 3/044 |
| | | | 345/179 |
| 2016/0132156 A1* | 5/2016 | Park | G06F 3/044 |
| | | | 345/174 |
| 2016/0147317 A1* | 5/2016 | Vandermeijden | G06F 3/046 |
| | | | 345/179 |
| 2019/0384416 A1* | 12/2019 | Yamashita | H01L 23/5252 |
| 2020/0125186 A1* | 4/2020 | Hara | G06F 3/044 |

\* cited by examiner

ACTIVE STYLUS PEN GENERATING OSCILLATION FREQUENCY RELATED TO APPLIED PRESSURE

CROSS-REFERENCE TO RELATED APPLICATIONS

This non-provisional application claims priority under 35 U.S.C. § 119(a) on Patent Application No(s). 105141759 filed in Taiwan, R.O.C. on Dec. 16, 2016, the entire contents of which are hereby incorporated by reference.

TECHNICAL FIELD

This disclosure relates to a stylus pen, particularly to an active stylus pen utilizing a variable component.

BACKGROUND

With the fast development of touch industry, electronic products having touch function get much popular in the world. These electronic products are, for example, smart phones, pads or navigation devices. Users can input information to the products by stylus pens. Generally speaking, a stylus pen with pressure sensing function generates corresponding information for a touch panel by pressure sensing. When the stylus pen contacts the touch panel and senses variation of an external pressure, a sensing frequency of the stylus pen varies accordingly. Thus, a corresponding handwriting trace is generated by the touch panel when the touch panel receives the signal sent by the stylus pen.

However, "ghost points", or say "leakage", may occur due to interference of environmental noise or other reasons. Hence, the stylus pen needs a mechanism for avoiding said "ghost points" problem or "leakage" problem to prevent users from related troubles.

SUMMARY

According to one or more embodiment of this disclosure, an active stylus pen comprises a touch component and a pressure sensing module. One end of the touch component is disposed at a nib part of the active stylus pen, wherein the touch component is configured to receive an external pressure. The pressure sensing module is connected to the touch component, wherein the pressure sensing module is configured to generate an oscillation signal, wherein the oscillation signal has a first frequency when the touch component receives the external pressure and the external pressure reaches a first threshold value, and wherein the oscillation signal is adjusted to have a second frequency when the touch component receives the external pressure and the external pressure does not reach the first threshold value; wherein a difference of the first frequency and the second frequency is larger than a second threshold value.

BRIEF DESCRIPTION OF THE DRAWINGS

The present disclosure will become better understood from the detailed description given herein below and the accompanying drawings which are given by way of illustration only and thus are not limitative of the present disclosure and wherein.

DETAILED DESCRIPTION

Figure 1:
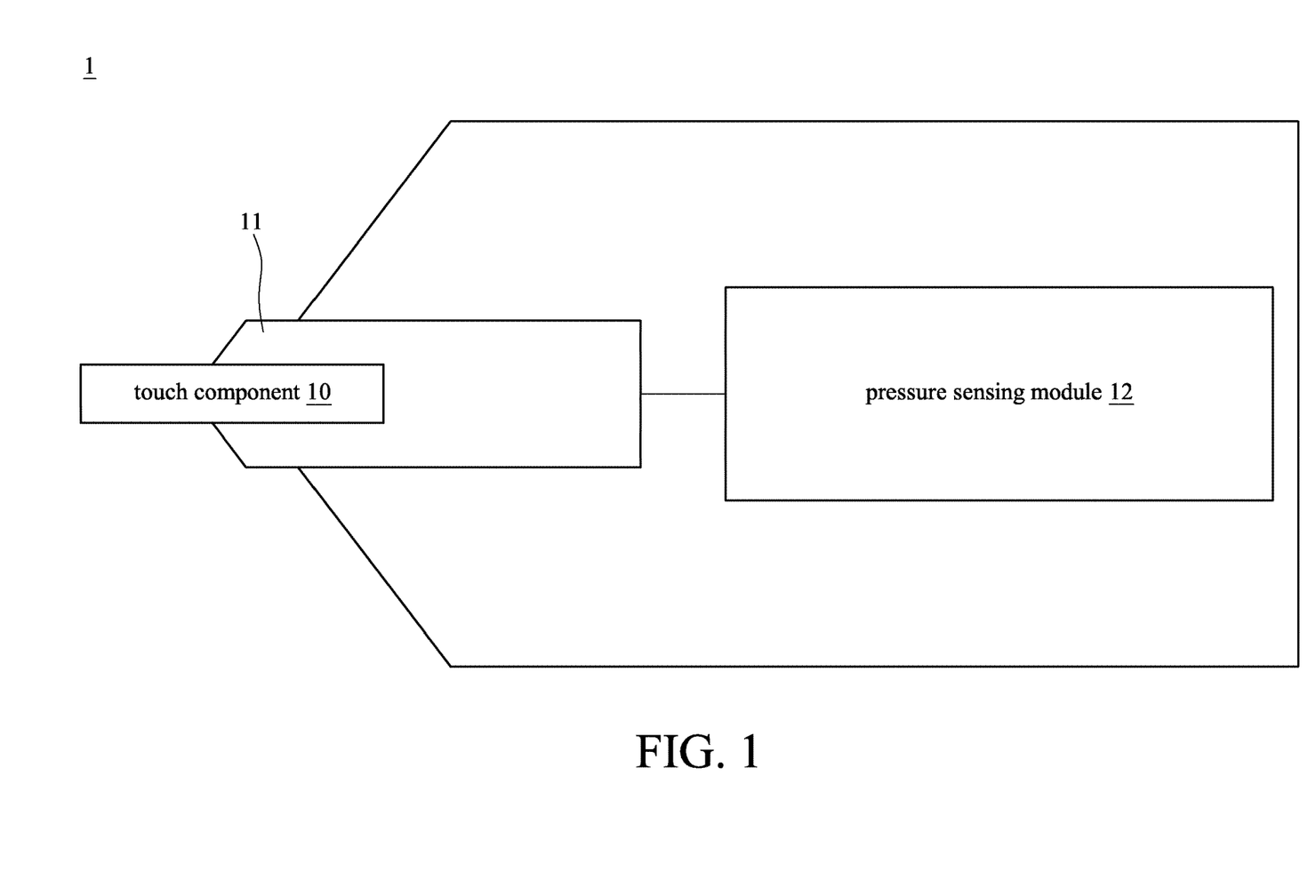
FIG. 1 is a function block diagram of an active stylus pen according to one embodiment of this disclosure.
Figure 2A:
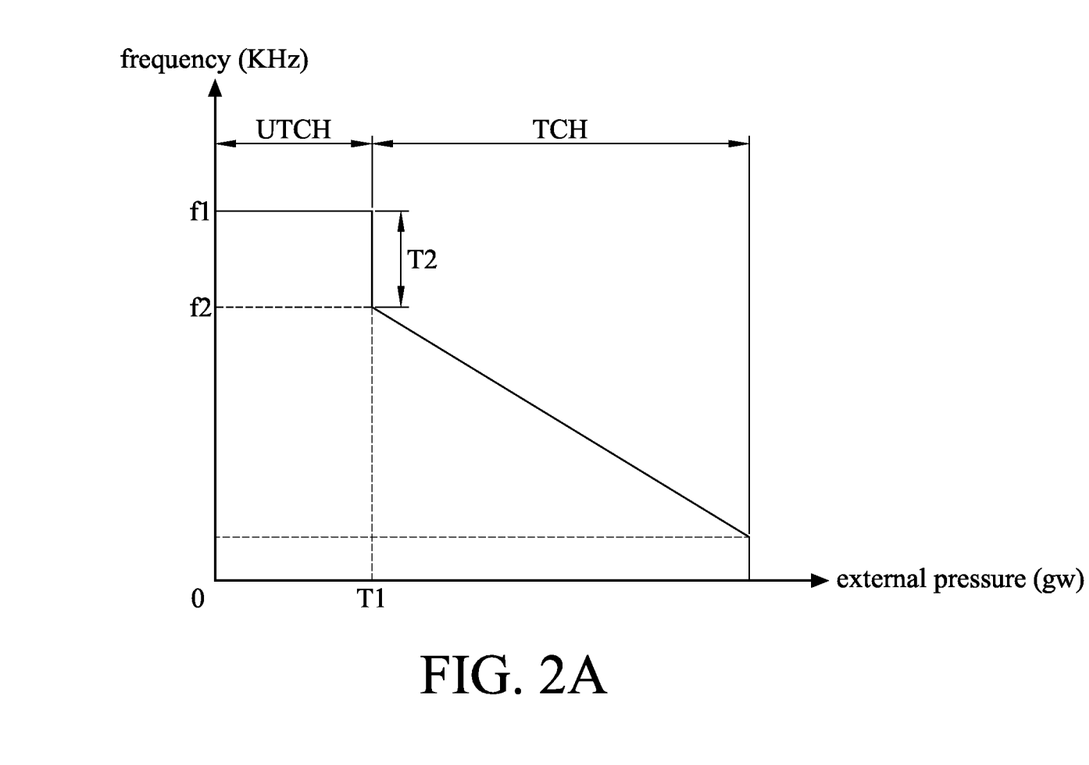
FIG. 2A is a frequency variation diagram of one embodiment of this disclosure.

Please refer to FIG. 1 and FIG. 2A. FIG. 1 is a function block diagram of an active stylus pen according to one embodiment of this disclosure. FIG. 2A is a frequency variation diagram of one embodiment of this disclosure. As shown in FIG. 1, an active stylus pen 1 comprises a touch component 10 and a pressure sensing module 12. One end of the touch component 10 is disposed at a nib part 11 of the active stylus pen 1 and part of the touch component 10 is exposed to the outside of the nib part 11. The touch component 10 is configured to receive an external pressure. In one example, said external pressure means the reaction force applied to the active stylus pen 1 by the touch panel when the active stylus pen 1 touches the touch panel. The pressure sensing module 12 is connected to the touch component 10. The pressure sensing module 12 is configured to generate an oscillation signal. Said oscillation signal is sent by the active stylus pen 1 and is transmitted to a corresponding touch panel for performing corresponding acts. Said corresponding acts may be, for example, showing a handwriting trace by the touch panel. In this embodiment, as shown in FIG. 1 and FIG. 2A, the oscillation signal has a first frequency f1 when the external pressure received by the touch component 10 is less than a first threshold value; the oscillation signal has a second frequency f2 when the external pressure received by the touch component 10 is not less than a first threshold value. Furthermore, the difference of the first frequency f1 and the second frequency f2 is larger than a second threshold.

Specifically, in the embodiment of the FIG. 2A, the oscillation signal generated by the pressure sensing module 12 has the first frequency f1 when the external pressure received by the touch component 10 is less than the first threshold value T1. On the contrary, the oscillation signal generated by the pressure sensing module has the second frequency f2 when the external pressure received by the touch component 10 reaches the first threshold value T1. As shown in FIG. 2A, the frequency of the oscillation signal maintains its frequency as the first frequency f1 when the external pressure is less than the first threshold value T1. In accordance, the active stylus pen is in an un-touched status, corresponding to the un-touched zone UTCH in FIG. 2A. No corresponding act is performed by the touch panel when the touch panel receives the oscillation signal having the first frequency f1. In other words, the active stylus pen 1 and the touch panel jointly determine that the user does not mean to perform touch operations. On the contrary, the frequency of the oscillation signal decreases when the external pressure reaches the first threshold T1 or even further increases. In other words, the frequency of the oscillation signal gradually decreases from the second frequency f2 according to the external pressure by this situation. In accordance, the active stylus pen is in a touch status, corresponding to the touch zone TCH in FIG. 2A. In the touch zone TCH, the frequency of the oscillation signal varies with the strength of the external pressure, making the touch panel act accordingly, such as generating handwriting traces in different types.

Figure 2B:
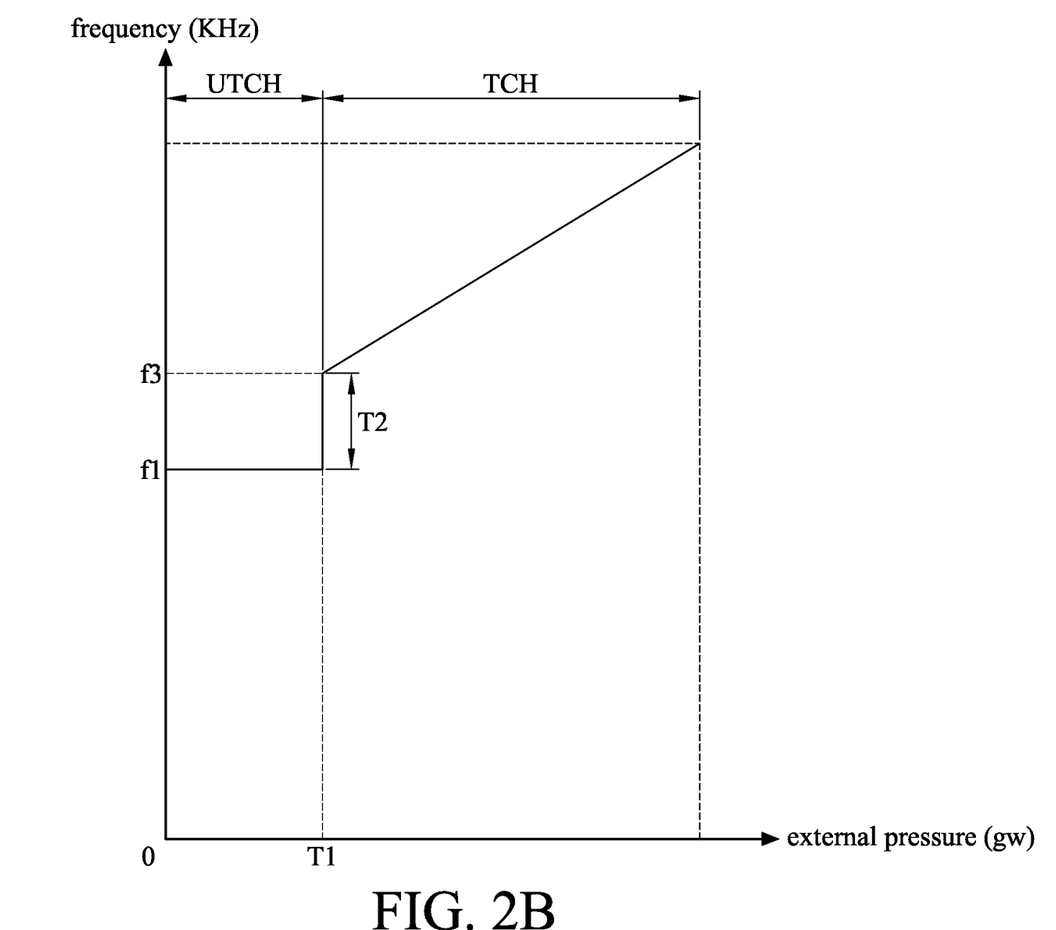
FIG. 2B is a frequency variation diagram of another embodiment of this disclosure.

Please refer to FIG. 1 and FIG. 2B. FIG. 2B is a frequency variation diagram of another embodiment of this disclosure. In this embodiment, as shown in FIG. 2B, the oscillation signal has the first frequency f1 when the external pressure less than the first threshold value T1 is received by the touch component 10. In accordance, the active stylus pen is in the un-touched status corresponding to the un-touched zone UTCH in FIG. 2B. The frequency of the oscillation signal is adjusted to the third frequency f3 when the external pressure reaching the first threshold T1 is received by the touch component 10. The difference between the first frequency f1 and the third frequency f3 is larger than the second threshold T2. The difference between the FIG. 2B and the FIG. 2A lies in that the frequency of the oscillation signal increases with the external pressure when the external reaches the first threshold T1 and keeps increasing gradually in FIG. 2B. In other words, the frequency of the oscillation signal increases from the third frequency f3 according to the external pressure in such a scenario. In accordance, the active stylus pen is in the touch status corresponding to the touch zone TCH of FIG. 2B.

Figure 3:
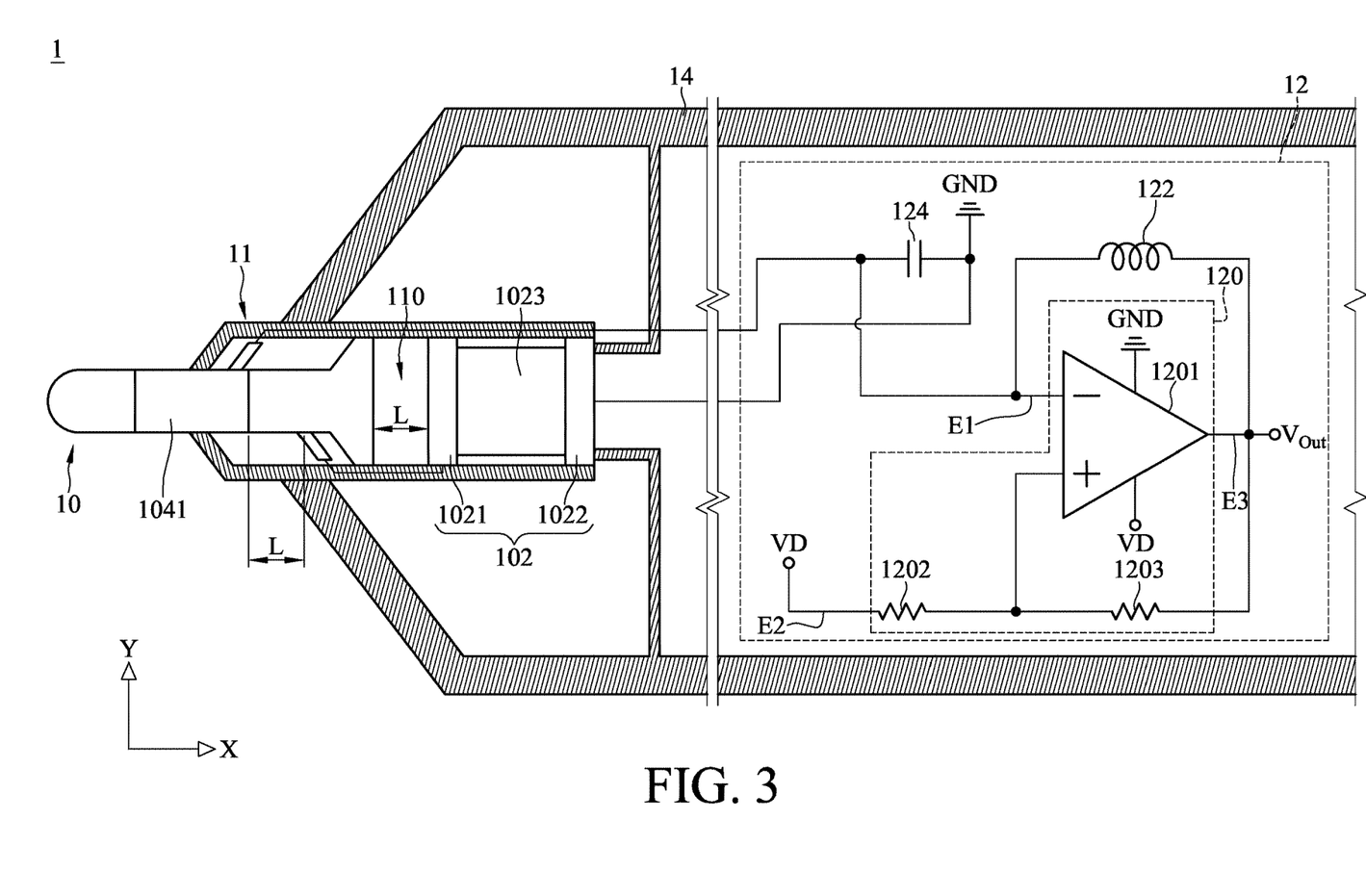
FIG. 3 is a structure and circuit schematic diagram of an active stylus pen according to this disclosure.

For easy understanding, the followed embodiment is illustrated according to FIG. 2A. Please refer to FIG. 3. FIG. 3 is a structure and circuit schematic diagram of an active stylus pen according to this disclosure. To clearly illustrate the operation of the active stylus pen, FIG. 3 is divided into a circuit part on the right hand side of FIG. 3 and a structural part on the left hand side of FIG. 3, which respectively illustrate the equivalent circuit of the pressure module 12 and the mechanical structure of the touch component 10. As shown in FIG. 3, the pressure sensing module 12 comprises a first active circuit 120, an inductor 122 and a first capacitor 124. The first active circuit 120 has a first receiving terminal E1, a second receiving terminal E2 and a first output terminal E3. The second receiving terminal E2 receives an operating voltage VD. The inductor 122 has a first end and a second end. The first end of the inductor 122 is electrically connected to the first output terminal E3 of the first active circuit 120. The first capacitor 124 has a first end and a second end. The second end of the first capacitor 124 receives a ground voltage GND. In one embodiment, as shown in the structure schematic of FIG. 3, the nib part 11 of the active stylus pen 1 has an aperture 110. The touch component 10 comprises a variable capacitor 102 and a linkage component 104. The variable capacitor 102 has a first electrode 1021, a second electrode 1022 and an elastic member 1023. The elastic member 1023 is located between the first electrode 1021 and the second electrode 1023.

In practice, said elastic member 1023 is made by flexible insulation material, such as rubber, silicon or a component having flexibility such as a plastic spring. The first electrode 1021 and the second electrode 1022 connected with the two ends of the elastic member 1023 store electric charge, thus the first electrode 1021, second electrode 1022, and elastic member 1023 form a capacitor jointly. The distance between the first electrode 1021 and the second electrode 1022 can be adjusted by applying pressure to deform the elastic member 1023, thus the capacitance of the variable capacitor 102 is changed accordingly. The second electrode 1022 of the variable 102 receives the ground voltage GND. The first electrode 1021 is fixed at the nib part 11. The second electrode 1022 is fixed at a body 14. The nib part 11 is movable relatively to the body 14 and along the axis of the body 14 of the active stylus pen 1.

Figure 4:
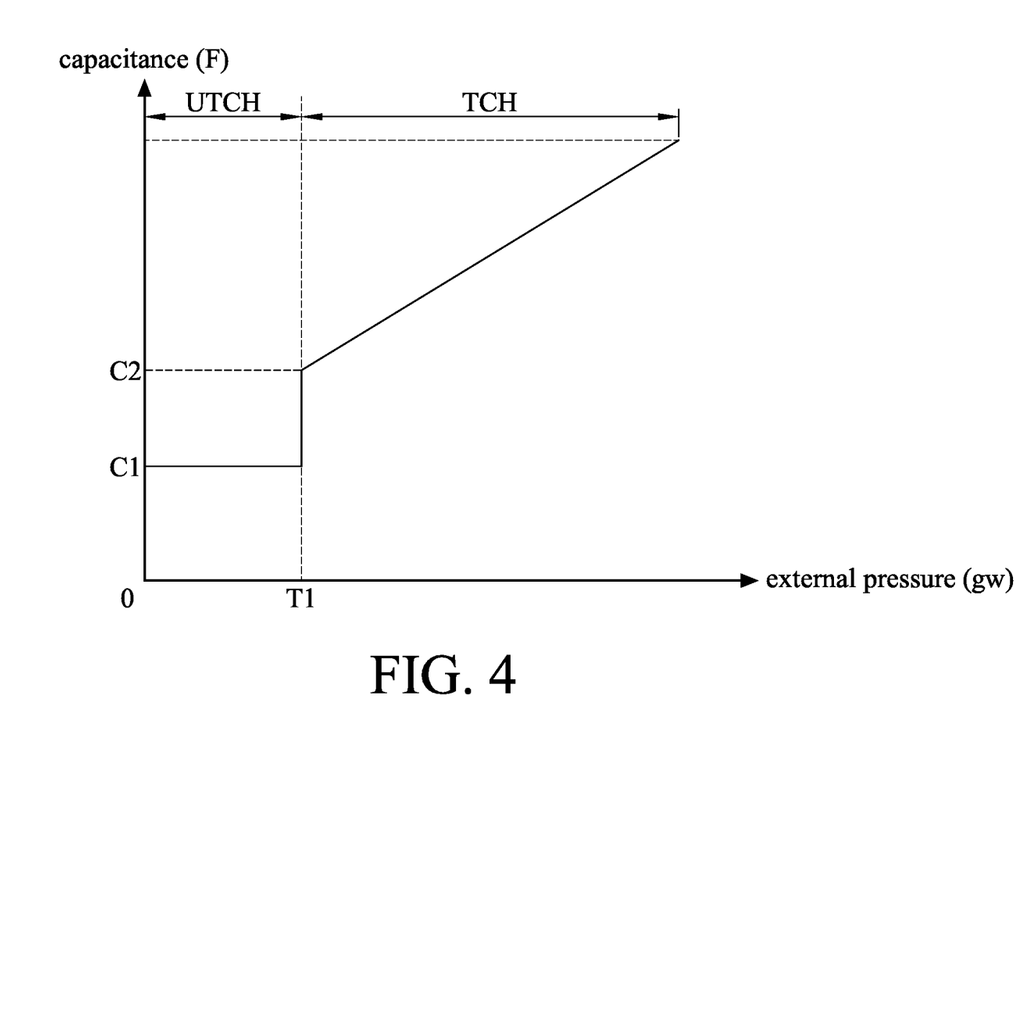
FIG. 4 is a capacitance variation diagram according to one embodiment of this disclosure.
Figure 5:
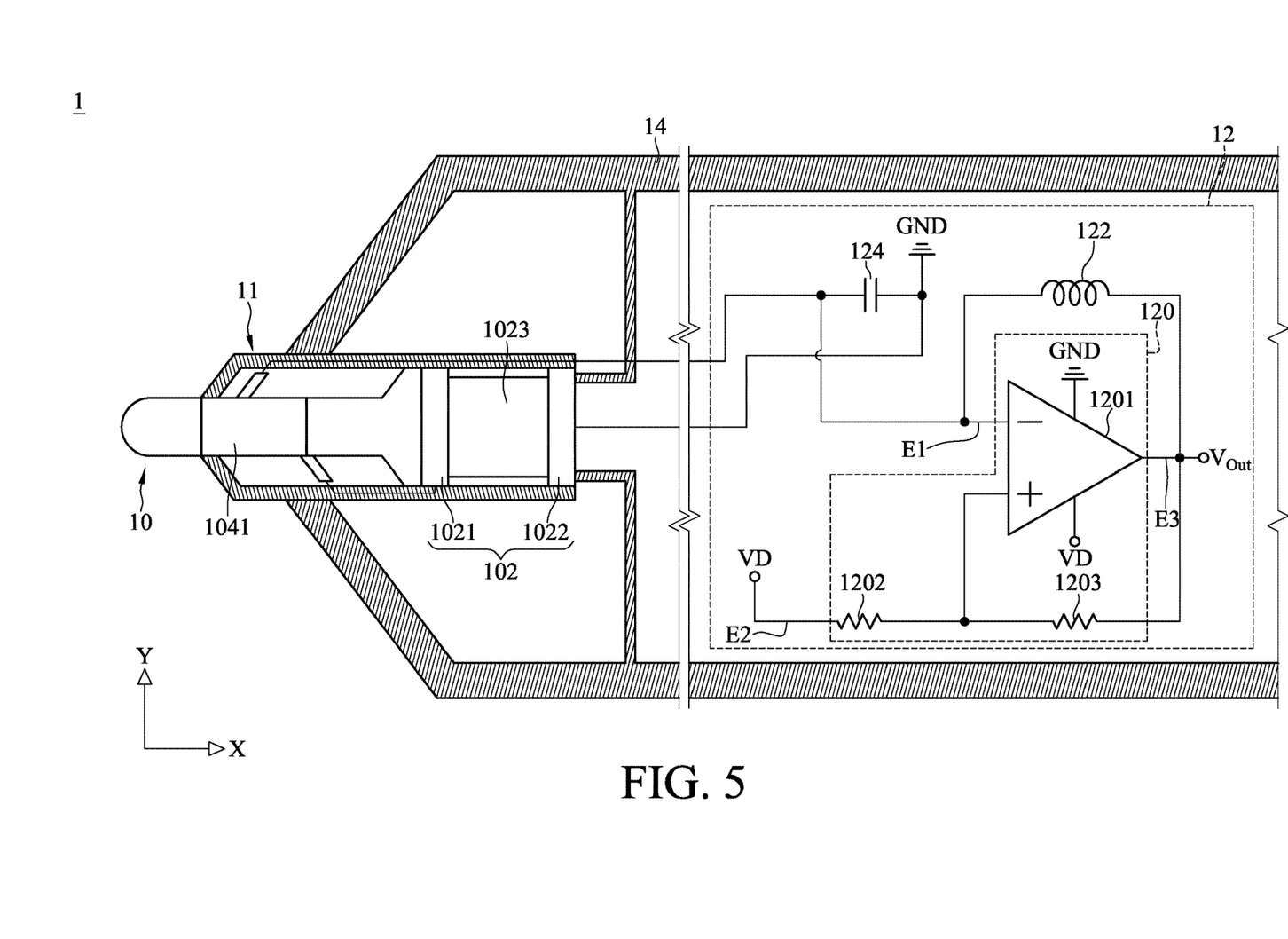
FIG. 5 is a structure and circuit schematic diagram of an active stylus pen according to this disclosure.

Part of the linkage component 104 is slidable relatively to the body 14 and along the aperture 110. The linkage component 104 comprises a metal part 1041. The first end of the first capacitor 124, the second end of the inductor 122 and the first receiving terminal E1 contact the metal part 1041 of the linkage component 104. Please refer to FIG. 4. FIG. 4 is a capacitance variation diagram according to one embodiment of this disclosure and corresponds to FIG. 2A. The linkage component 104 slides along the axis of the nib part 11 toward the variable capacitor 102 when the touch component 10 begins to receive the external pressure and the external pressure does not reach the first threshold value f1. In accordance, the capacitance of the active stylus pen maintains its capacitance as a capacitance C1 because the metal part 1041 does not contact the first electrode 1021 of the variable capacitor 102. Thus, the oscillation signal has the first frequency f1. In accordance, the active stylus pen 1 is in the un-touch status corresponding to the un-touch zone UTCH in FIG. 2A and FIG. 4. Please refer to FIG. 5. FIG. 5 is a structure and circuit schematic diagram of an active stylus pen according to this disclosure. As shown in FIG. 5, the linkage component 104 contacts the second electrode 102 of the variable capacitance 102 when the external gradually increases and reaches the first threshold T1. Meanwhile, the metal part 1041 contacts the first electrode of the variable capacitor 102 because the linkage component 104 slides a distance L toward the variable capacitor 102. In accordance, a current path between the first end of the first capacitor 124 and the first electrode 1021 of the variable capacitor 102 is built. In accordance, the capacitance of the active stylus pen 1 increased from the capacitance C1 to a second capacitance C2 and thus the oscillation signal has the second frequency f2.

Figure 6:
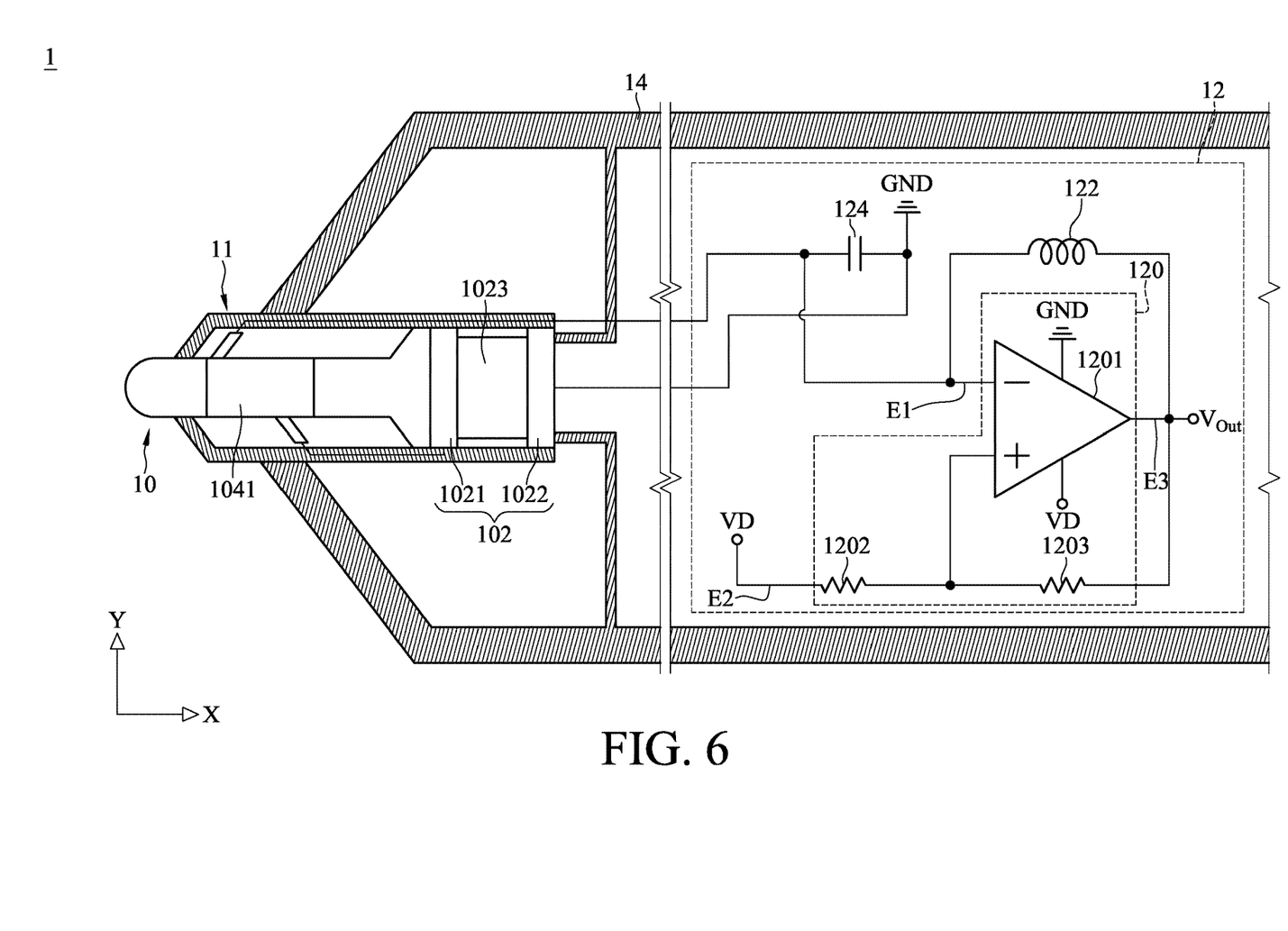
FIG. 6 is a structure and circuit schematic diagram of an active stylus pen according to this disclosure.

Please refer to FIG. 6. FIG. 6 is a structure and circuit schematic diagram of an active stylus pen according to this disclosure. The linkage component 104 keeps sliding toward the variable 102 and presses the first electrode 1021 if the external pressure keeps increasing and excesses the first threshold T1 when the linkage component 104 contacts the second electrode 1022 of the variable capacitor 102. As shown in FIG. 6, the nib part 11 is driven to slide toward the second electrode 1022 as well as the elastic member 1023 clamped by the first electrode 1021 and the second electrode 1022 is thus pressed and deformed when the first electrode 1021 fixed at the nib part 11 is pressed. As shown in FIG. 6, since the second electrode 1022 is fixed at the body 14, the distance between the first electrode 1021 and the second electrode 1022 decreases gradually and makes the capacitance gradually increases from the capacitance C2 when the elastic member is pressed with. In accordance, the active stylus pen 1 is in the touch status corresponding to the touch zone TCH in FIG. 2A and FIG. 4. In another example, the frequency of the oscillation signal increases and the capacitance of the active stylus pen 1 decreases when the external pressure reaches the first threshold T1 and keeps increasing. Based on the previous embodiments, a person has ordinary skill in the art can understand the structure and acts so related contents are not repeated herein.

In one embodiment, the first active circuit 120 comprises a first resistor 1202 and a second resistor 1203. The first resistor 1202 has a first end and a second end. The first end of the first resistor 1202 receives the operating voltage VD. The second resistor 1203 has a first end and a second end. The first end of the second resistor 1203 is electrically connected to the second end of the first resistor 1202. The second end of the second resistor 1203 is electrically connected to the first output terminal E3. A first operation amplifier 1201 has a first voltage input terminal, a second voltage input terminal and a first voltage output terminal. The first voltage input terminal is electrically connected to the first receiving terminal E1. The second voltage input terminal is electrically connected to the second end of the first resistor 1202 and the first end of the second resistor 1203. The first voltage output terminal electrically connected to the first output terminal E3.

Generally speaking, when a user performs touch operation by an active stylus pen on a touch panel, misjudgements usually occur due to noise from the environment. For example, when the user holds the stylus pen by hand and makes the active stylus pen be very close to a touch panel, the user may not mean to input information to the touch panel by the active stylus pen. However, the touch panel may perform unexpected acts because of said noise, which is so-called "leakage". On the contrary, with the difference between the first frequency and the second frequency of the present disclosure, the active stylus pen can determine whether the user means to perform touch operation more accurately. Thus, the "leakage" problem can be avoided and the user experience can be improved.

Figure 7:
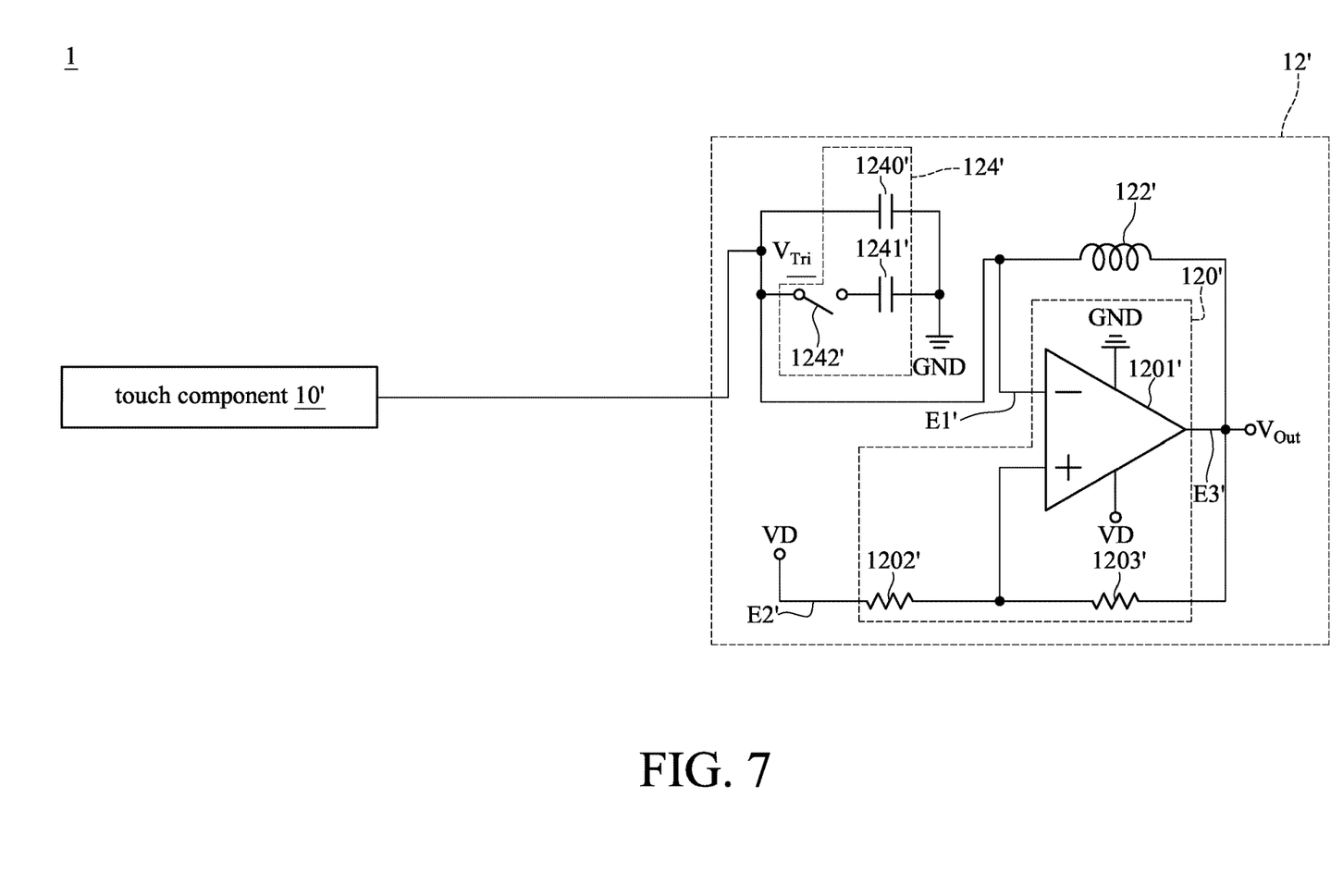
FIG. 7 is an equivalent circuit schematic diagram of an active stylus pen according to this disclosure.

Please refer to FIG. 7. FIG. 7 is an equivalent circuit schematic diagram of an active stylus pen according to this disclosure and is corresponding to FIG. 1. In this embodiment, a pressure sensing module 12' comprises a second active circuit 120', an inductor 122' and a variable component 124'. The second active circuit 120' comprises a third receiving terminal E1', a fourth receiving terminal E2' and a second output terminal E3'. The third receiving terminal E1' is electrically connected to a trigger terminal Vtri. The fourth receiving terminal E2' is configured to receive the operating voltage VD. The inductor 122' comprises a first end and a second end. The first end of the inductor 122' is electrically connected to the second output terminal E3' of the second active circuit 120'. The second end of the inductor 122' is electrically connected to the trigger terminal Vtri. The variable component 124' is electrically connected to the second active circuit 120' and the inductor 122'. When the touch component 10' receives the external pressure and the external pressure does not reach the first threshold value T1, the component characteristic of the variable component 124' maintains its frequency and the oscillation signal has the first frequency f1. When the touch component 10' receives the external pressure and the external pressure reaches the first threshold value T1, the component characteristic of the variable component 124' begins to change and the oscillation signal has the second frequency f2. In an example, the variable component 124' comprises a variable capacitor and said component characteristic is corresponding to the capacitance of the variable capacitor. In another example, the variable component 124' comprises a variable inductor, and said component characteristic is corresponding to the inductance of the variable inductor. In the other example, the variable component 124' comprises a variable resistor, and said component characteristic is corresponding to the resistance of the variable resistor.

In one embodiment, the variable component 124' comprises a first capacitor 1240', a variable capacitor 1241' and a first switch 1242'. The first capacitor 1240' has a first end and a second end. The second end of the first capacitor is configured to receive the operating voltage VD. The variable component 124' has a first end and a second end. The second end of the variable component 124' is configured to receive the ground voltage GND. The first switch 1242' is electrically connected to the first end of the first capacitor 1240' and the first end of the variable capacitor 1241'. When the touch component 10' receives the external pressure and the external pressure does not reach the first threshold value, the first switch 1242' is disabled and the oscillation signal has the first frequency f1. When the touch component 10' receives the external pressure and the external pressure reaches the first threshold value, the first switch 1242' is enabled and the oscillation signal has the second frequency. For an example, when the active stylus pen 1 slightly contacts the touch panel with a touch force applied to the touch panel less than the first threshold T1, the first switch 1242' is disabled. In accordance, as shown in FIG. 2, the oscillation signal has the first frequency f1 and the touch panel does not perform acts related to touch functions. When the touch force applied to the touch panel reaches the first threshold T1, the first switch 1242' is enabled. In accordance, as shown in FIG. 2, the frequency of the oscillation signal decreases from the first frequency f1 to the second frequency f2 and the touch panel performs acts related to touch functions. When the touch force applied to the touch panel keeps increasing and excesses the first threshold T1, the frequency of the oscillation signal increases as well. Thus, the touch panel performs corresponding acts.

By another example, said first switch 1242' can be a button on the body 14 of the active stylus pen 1. The user does not press the button if no operation is needed. Under this situation, the first switch 1242' is disabled and the oscillation signal provided by the active stylus pen 1 has the first frequency f1 and do not drive the touch panel to perform acts related to touch functions. On the contrary, when the user wants to control the touch panel to write or to draw for example, the user can press the button to enable the first switch 1242'. In accordance, the frequency of the oscillation signal is equal to or less than the second frequency and the touch panel begins to perform corresponding acts.

In one example, said second active circuit 120' comprises a third resistor 1202', a fourth resistor 1203' and a second operation amplifier 1201'. The third resistor 1202' has a first end and a second end. The first end of the third resistor 1202' is configured to receive the operating voltage VD. The fourth resistor 1203' comprises a first end and a second end. The first end of the fourth resistor 1203' is electrically connected to the second end of the third resistor 1202'. The second end of the fourth resistor 1203' is electrically connected to the second output terminal E3'. The second operation amplifier 1201' comprises a first voltage input terminal, a second voltage input terminal and a voltage output terminal. The first voltage input terminal is electrically connected to a trigger terminal. The second voltage input terminal is electrically connected to the second terminal of the third resistor 1202' and the first terminal of the fourth resistor 1203'. The voltage output terminal is electrically connected to the second output terminal E3.

The active stylus pens in the previous embodiments can avoid the "leakage" problem by utilizing the capacitance of the variable capacitor 1241' together with the structure in FIG. 3 or said button structure. Nevertheless, in another embodiment, the active stylus pen avoids the "leakage" problem by utilizing other variable component. For example, the variable capacitor 1241' included in the variable component of the active stylus pen in FIG. 7 can be replaced with a variable inductor. The user can adjust the location relative to other components of the core of the variable inductor or adjust the coil number of the variable inductor by pressing the button to change the inductance of the variable inductor. For another example, the variable capacitor 1241' included in the variable component of the active stylus pen in FIG. 7 can be replaced with a variable resistor. The user can adjust the location of a sliding node of the variable inductor by pressing the button to change the resistance of the variable resistor. The variable component is not limited the above examples.

In view of the above description, this disclosure provides an active stylus utilizing the pressure applied to the active stylus pen and the switch component (or the linkage component). Thus, there's a difference between the first frequency and the second frequency of the oscillation signal. By utilizing the frequency difference, the "ghost node" problem or the "leakage" problem can be avoided and the user experience is improved.

What is claimed is:

1. An active stylus pen generating an oscillation signal related to an external pressure, comprising:
   a touch component, with one end of the touch component disposed at a nib part of the active stylus pen, wherein the touch component is configured to receive the external pressure; and
   a pressure sensing module, connected to the touch component, wherein the pressure sensing module is configured to generate the oscillation signal, wherein the oscillation signal has a first frequency to make the active stylus pen be in an un-touched status when the touch component receives the external pressure and the external pressure does not reach a first threshold value, when the active stylus pen is in the un-touched status, no corresponding act is performed by a touch panel when the touch panel receives the oscillation signal having the first frequency and wherein the oscillation signal is adjusted to have a second frequency which is smaller than the first frequency to switch the active stylus pen from the un-touched status to a touched status when the touch component receives the external pressure and the external pressure reaches the first threshold value and the first threshold value is a boundary defining the un-touched status and the touched status, when the active stylus pen is in the touched status, a corresponding act is performed by the touch panel when the touch panel receives the oscillation signal having the second frequency;
   wherein the pressure sensing module comprises:
   a first active circuit, having a first receiving terminal, a second receiving terminal and a first output terminal, with the first receiving terminal electrically connected to a trigger terminal, and with the second receiving terminal configured to receive an operating voltage;
   an inductor, having a first end and a second end, with the first end of the inductor electrically connected to the first output terminal of the first active circuit, and with the second end of the inductor electrically connected to the trigger terminal; and
   a variable component, electrically connected to the first active circuit and the inductor, wherein, a component characteristic of the variable component maintains its frequency and the oscillation signal has the first frequency when the touch component receives the external pressure and the external pressure does not reach the first threshold value, and wherein the component characteristic of the variable component changes and induces the oscillation signal to have the second frequency when the touch component receives the external pressure and the external pressure reaches the first threshold value;
   wherein the variable component comprises:
   a first capacitor having a first end and a second end, with the second end of the first capacitor configured to receive a ground voltage;
   a variable capacitor having a first end and a second end, with the second end of the variable capacitor configured to receive the ground voltage; and
   a first switch electrically connected to the first end of the first capacitor and the first end of the variable capacitor, wherein the first switch is disabled and the oscillation signal has the first frequency when the touch component receives the external pressure and the external pressure does not reach the first threshold value, and wherein the first switch is enabled and the oscillation signal has the second frequency when the touch component receives the external pressure and the external pressure reaches the first threshold value, and wherein the component characteristic is corresponding to a capacitance of the variable capacitor.

2. The active stylus pen according to claim 1, wherein the first active circuit comprises:
   a first resistor having a first end and a second end, with the first end of the first resistor configured to receive the operating voltage;
   a second resistor having a first end and a second end, with the first end of the second resistor electrically connected to the second end of the first resistor and the second end of the second resistor electrically connected to the first output terminal; and
   a first operation amplifier having a first voltage input terminal, a second voltage input terminal and a first voltage output terminal, with the first voltage input terminal electrically connected to the trigger terminal, the second voltage input terminal electrically connected to the second end of the first resistor and the first end of the second resistor, and the first voltage output terminal electrically connected to the first output terminal.

3. An active stylus pen generating an oscillation signal related to an external pressure, comprising:
   a touch component, with one end of the touch component disposed at a nib part of the active stylus pen, wherein the touch component is configured to receive the external pressure; and
   a pressure sensing module, connected to the touch component, wherein the pressure sensing module is configured to generate the oscillation signal, wherein the oscillation signal has a first frequency to make the active stylus pen be in an un-touched status when the touch component receives the external pressure and the external pressure does not reach a first threshold value, when the active stylus pen is in the un-touched status, no corresponding act is performed by a touch panel when the touch panel receives the oscillation signal having the first frequency and wherein the oscillation signal is adjusted to have a second frequency which is smaller than the first frequency to switch the active stylus pen from the un-touched status to a touched status when the touch component receives the external pressure and the external pressure reaches the first threshold value and the first threshold value is a boundary defining the un-touched status and the touched status, when the active stylus pen is in the touched status, a corresponding act is performed by the touch panel when the touch panel receives the oscillation signal having the second frequency;
   wherein the pressure sensing module comprises:

a first active circuit, having a first receiving terminal, a second receiving terminal and a first output terminal, with the first receiving terminal electrically connected to a trigger terminal, and with the second receiving terminal configured to receive an operating voltage;

an inductor, having a first end and a second end, with the first end of the inductor electrically connected to the first output terminal of the first active circuit, and with the second end of the inductor electrically connected to the trigger terminal; and a variable component, electrically connected to the first active circuit and the inductor, wherein, a component characteristic of the variable component maintains its frequency and the oscillation signal has the first frequency when the touch component receives the external pressure and the external pressure does not reach the first threshold value, and wherein the component characteristic of the variable component changes and induces the oscillation signal to have the second frequency when the touch component receives the external pressure and the external pressure reaches the first threshold value;

wherein the variable component comprises:

a first capacitor having a first end and a second end, with the second end of the first capacitor configured to receive a ground voltage;

a variable inductor having a first end and a second end, with the second end configured to receive the ground voltage; and a first switch electrically connected to the first end of the first capacitor and the first end of the variable inductor, wherein the first switch is disabled and the oscillation signal oscillates with the first frequency when the touch component receives the external pressure and the external pressure does not reach the first threshold value, and wherein the first switch is enabled and the oscillation signal oscillates with the second frequency when the touch component receives the external pressure and the external pressure reaches the first threshold value, wherein the component characteristic is corresponding to an inductance of the variable inductor.

4. The active stylus pen according to claim 3, wherein the first active circuit comprises:

a first resistor having a first end and a second end, with the first end of the first resistor configured to receive the operating voltage;

a second resistor having a first end and a second end, with the first end of the second resistor electrically connected to the second end of the first resistor and the second end of the second resistor electrically connected to the first output terminal; and a first operation amplifier having a first voltage input terminal, a second voltage input terminal and a first voltage output terminal, with the first voltage input terminal electrically connected to the trigger terminal, the second voltage input terminal electrically connected to the second end of the first resistor and the first end of the second resistor, and the first voltage output terminal electrically connected to the first output terminal.

5. An active stylus pen generating an oscillation signal related to an external pressure, comprising:

a touch component, with one end of the touch component disposed at a nib part of the active stylus pen, wherein the touch component is configured to receive the external pressure; and a pressure sensing module, connected to the touch component, wherein the pressure sensing module is configured to generate the oscillation signal, wherein the oscillation signal has a first frequency to make the active stylus pen be in an un-touched status when the touch component receives the external pressure and the external pressure does not reach a first threshold value, when the active stylus pen is in the un-touched status, no corresponding act is performed by a touch panel when the touch panel receives the oscillation signal having the first frequency and wherein the oscillation signal is adjusted to have a second frequency which is smaller than the first frequency to switch the active stylus pen from the un-touched status to a touched status when the touch component receives the external pressure and the external pressure reaches the first threshold value and the first threshold value is a boundary defining the un-touched status and the touched status, when the active stylus pen is in the touched status, a corresponding act is performed by the touch panel when the touch panel receives the oscillation signal having the second frequency;

wherein the pressure sensing module comprises:

a first active circuit, having a first receiving terminal, a second receiving terminal and a first output terminal, with the first receiving terminal electrically connected to a trigger terminal, and with the second receiving terminal configured to receive an operating voltage;

an inductor, having a first end and a second end, with the first end of the inductor electrically connected to the first output terminal of the first active circuit, and with the second end of the inductor electrically connected to the trigger terminal; and a variable component, electrically connected to the first active circuit and the inductor, wherein, a component characteristic of the variable component maintains its frequency and the oscillation signal has the first frequency when the touch component receives the external pressure and the external pressure does not reach the first threshold value, and wherein the component characteristic of the variable component changes and induces the oscillation signal to have the second frequency when the touch component receives the external pressure and the external pressure reaches the first threshold value;

wherein the variable component comprises:

a first capacitor having a first end and a second end, with the second end of the first capacitor configured to receive a ground voltage;

a variable resistor having a first end and a second end, with the second end configured to receive the ground voltage; and a first switch electrically connected to the first end of the first capacitor and the first end of the variable resistor, wherein the first switch is disabled and the oscillation signal oscillates with the first frequency when the touch component receives the external pressure and the external pressure does not reach the first threshold value, and wherein the first switch is enabled and the oscillation signal oscillates with the second frequency when the touch component receives the external pressure and the external pressure reaches the first threshold value, wherein the component characteristic corresponds to a resistance of the variable resistor.

6. The active stylus pen according to claim 5, wherein the first active circuit comprises:

a first resistor having a first end and a second end, with the first end of the first resistor configured to receive the operating voltage;

a second resistor having a first end and a second end, with the first end of the second resistor electrically connected to the second end of the first resistor and the second end of the second resistor electrically connected to the first output terminal; and a first operation amplifier having a first voltage input terminal, a second voltage input terminal and a first voltage output terminal, with the first voltage input terminal electrically connected to the trigger terminal, the second voltage input terminal electrically connected to the second end of the first resistor and the first end of the second resistor, and the first voltage output terminal electrically connected to the first output terminal.

7. An active stylus pen generating an oscillation signal related to an external pressure, comprising:

a touch component, with one end of the touch component disposed at a nib part of the active stylus pen, wherein the touch component is configured to receive the external pressure; and a pressure sensing module, connected to the touch component, wherein the pressure sensing module is configured to generate the oscillation signal, wherein the oscillation signal has a first frequency to make the active stylus pen be in an un-touched status when the touch component receives the external pressure and the external pressure does not reach a first threshold value, when the active stylus pen is in the un-touched status, no corresponding act is performed by a touch panel when the touch panel receives the oscillation signal having the first frequency and wherein the oscillation signal is adjusted to have a second frequency which is smaller than the first frequency to switch the active stylus pen from the un-touched status to a touched status when the touch component receives the external pressure and the external pressure reaches the first threshold value and the first threshold value is a boundary defining the un-touched status and the touched status, when the active stylus pen is in the touched status, a corresponding act is performed by the touch panel when the touch panel receives the oscillation signal having the second frequency;

wherein the pressure sensing module comprises:

a second active circuit having a third receiving terminal, a fourth receiving terminal and a second output terminal, with the fourth receiving terminal configured to receive an operating voltage;

an inductor having a first end and a second end, with the first end of the inductor electrically connected to the second output terminal of the second active circuit; and a first capacitor having a first end and a second end, with the second end of the first capacitor configured to receive a ground voltage;

wherein the active stylus pen further has a body, the nib part comprises an aperture and the touch component comprises:

a variable capacitor comprising a first electrode, a second electrode and an elastic member, with the elastic member disposed between the first electrode and the second electrode, the second electrode of the variable capacitor configured to receive the ground voltage and fixed to the body, and the first electrode fixed to the nib part, the second electrode is fixed at the body, the nib part is movable along an axis of the body; and a linkage component, with a part of the linkage component slidable along the aperture, comprising a metal part contacting the first end of the first capacitor, the second end of the inductor and the third receiving terminal, wherein the metal part contacts the first electrode of the variable capacitor by the sliding of the linkage component toward the variable capacitor along an axis of the nib part when the touch component receives the external pressure and the external pressure reaches the first threshold value, and a current path is made between the first end of the first capacitor and the first electrode of the variable capacitor, inducing the oscillation signal to have an oscillation frequency less than the second frequency.

8. The active stylus pen according to claim 7, wherein the linkage component slides toward the variable capacitor when the touch component receives the external pressure, and when the external pressure does not reach the first threshold value, the metal part is separated from the first end of the variable capacitor, the current path between the first end of the first capacitor and the first end of the variable capacitor is not made, and the oscillation signal has the first frequency.

9. The active stylus pen according to claim 7, wherein the second active circuit comprises:

a third resistor having a first end and a second end, with the first end of the third resistor configured to receive the operating voltage;

a fourth resistor, having a first end and a second end, with the first end of the fourth resistor electrically connected to the second end of the third resistor and the second end of the fourth resistor electrically connected to the second output terminal; and a second operation amplifier, having a third voltage input terminal, a fourth voltage input terminal and a second voltage output terminal, with the third voltage input terminal electrically connected to a trigger terminal, with the fourth voltage input terminal electrically connected to the second end of the third resistor and the first end of the fourth resistor, and with the second voltage output terminal electrically connected to the second output terminal.

* * * * *